(12) United States Patent
Seferidis et al.

(10) Patent No.: US 10,908,942 B2
(45) Date of Patent: Feb. 2, 2021

(54) VIRTUALIZATION DEVICE

(71) Applicant: Zeetta Networks Limited, Bristol (GB)

(72) Inventors: Vassilis Seferidis, Bristol (GB); Reza Nejabati, Bristol (GB)

(73) Assignee: Zeetta Networks Limited, Bristol (GB)

( * ) Notice: Subject to any disclaimer, the term of this patent is extended or adjusted under 35 U.S.C. 154(b) by 92 days.

(21) Appl. No.: 16/317,292

(22) PCT Filed: Sep. 6, 2017

(86) PCT No.: PCT/GB2017/052590
§ 371 (c)(1),
(2) Date: Jan. 11, 2019

(87) PCT Pub. No.: WO2018/011607
PCT Pub. Date: Jan. 18, 2018

(65) Prior Publication Data
US 2019/0250940 A1    Aug. 15, 2019

(30) Foreign Application Priority Data

Jul. 13, 2016 (GB) .................................. 1612145.1

(51) Int. Cl.
*G06F 9/455* (2018.01)
*G06F 9/50* (2006.01)
*H04L 12/24* (2006.01)

(52) U.S. Cl.
CPC .......... *G06F 9/45558* (2013.01); *G06F 9/455* (2013.01); *G06F 9/5077* (2013.01);
(Continued)

(58) Field of Classification Search
CPC .................................................. G06F 9/45558
See application file for complete search history.

(56) References Cited

U.S. PATENT DOCUMENTS

2014/0365196 A1* 12/2014 Melander ............... G06F 9/455
703/13
2016/0087846 A1    3/2016 Prasad et al.
(Continued)

OTHER PUBLICATIONS

United Kingdom Search Report for related GB Application No. 1612145.1 report dated Jan. 24, 2017.
(Continued)

*Primary Examiner* — Charlie Sun
(74) *Attorney, Agent, or Firm* — von Briesen & Roper, s.c.

(57) ABSTRACT

A virtualization device for composing a virtual network for implementation using physical network infrastructure, the virtualization device comprising; a node functionality and constraints module, configured to identify functionality and constraints of one or more nodes of the physical network infrastructure; a link constraints module, configured to identify constraints of one or more links of the physical network infrastructure; a network modeller module, configured to generate a model of the physical network infrastructure, based on the identified functionality and constraints of the nodes and on the identified constraints of the links; a virtual network composer module configured to receive a request for composition of a desired virtual network and to map the desired virtual network onto the physical network infrastructure based on the model generated by the network modelling module; and one or more node and link mapping modules for simultaneously mapping a virtual node of the desired virtual network onto one or more physical nodes or part of a physical node of the physical network infrastructure and for mapping a virtual link associated with the virtual node onto one or more physical links or part of a physical link of the physical network infrastructure.

18 Claims, 5 Drawing Sheets

(52) U.S. Cl.
 CPC ......... *H04L 41/0896* (2013.01); *H04L 41/12* (2013.01); *G06F 2009/4557* (2013.01); *G06F 2009/45591* (2013.01); *G06F 2009/45595* (2013.01)

(56) References Cited

U.S. PATENT DOCUMENTS

2016/0156513 A1    6/2016  Zhang et al.
2017/0324612 A1*  11/2017  Perez .................. H04L 41/0893

OTHER PUBLICATIONS

International Search Report Application No. PCT/GB20171052590, dated Oct. 11, 2017.
Inoue Koki et al: "Adaptive VNE method based on Yuragi principle for software defined infrastructure", 2016 IEE 17th International conference on high performance switching and drouting (HPSR), IEE, Jun. 14, 2016 (Jun. 14, 2016), pp. 188-193, XP032932674, DOI: 10.1109/HPSR.2016.7525665 [retrieved on Jul. 28, 2016] paragraohs [0001], [0002].
Bays Leonardo Richter et al. "Virtual network embedding in software-defined networks", NOMS 2016-2016 IEEE/ IFIP Network Operations and management symposium, IEEE, Apr. 25, 2016 (Apr. 25, 2016), pp. 10-18, XP032918083, DOI: 10.1109/NOMS.2016.7502791 [retrieved on Jun. 30, 2016] paragraphs [0001]-[0003].

\* cited by examiner

VIRTUALIZATION DEVICE

CROSS-REFERENCE TO RELATED APPLICATION

This Application is a 35 USC § 371 US National Stage filing of International Application No, PCT/GB2017/052590 filed on Sep. 6, 2017 which claims priority under the Paris Convention to United Kingdom Patent Application No. 1612145.1 filed on Jul. 13, 2016.

TECHNICAL FIELD

The present application relates to a virtualization device

BACKGROUND TO THE INVENTION

Internet applications are becoming increasingly diverse in terms of their network requirements and usage patterns. Therefore, a key challenge for network operators is the deployment of dynamic network infrastructure capable of supporting all application types, each with their own access and network resource usage patterns.

Network virtualization technology aims to address this challenge. It enables infrastructure providers to partition or aggregate their network resources (i.e. switches, routers, ports, links and bandwidth) into virtual resources and connect them together in any desired or required topology. As such, network virtualization technology permits the composition of multiple coexisting, but isolated, virtual networks running over a shared physical infrastructure. Network virtualization technology permits the composition of bespoke virtual networks for different applications and services over the same physical infrastructure, and allows independent control of each virtual network. Utilising virtualization technology, network infrastructure providers can create and operate application specific virtual networks without significant investment or change in the underlying physical infrastructure.

Network virtualization gives rise to a number of advantages. For example, each virtual network can have a different network architecture, and can operate under a different network protocol, while sharing the same physical infrastructure. As a result, the cost of owning physical network elements for individual network architecture deployment is reduced, since the same physical network infrastructure is used for different virtual networks.

Additionally, dedicated virtual networks can be used by service providers and operators to test new technologies, protocols, network architectures and applications. Therefore, service innovation is easier and cheaper with network virtualization.

Network virtualization can be used to enhance quality of service (QoS), application isolation and security over networks by dedicating a separate virtual network for each service class or application type.

FIG. 1 is a schematic diagram illustrating the concept of network virtualization. Network virtualization is typically achieved using one of two approaches: (1) aggregation or (2) slicing. In FIG. 1, a virtual infrastructure comprises two types of virtual nodes, namely virtual nodes made of aggregated physical nodes (virtual nodes A and B) and virtual nodes made of slices of physical nodes (virtual nodes C and D).

As shown in the right-hand side of FIG. 1, the virtualization mechanism acts as a middleware that can be performed by a separate entity sitting between the physical network infrastructure and the network control plane. Alternatively, the network virtualization mechanism can be integrated into the control plane.

A virtual network is a set of virtual network nodes interconnected by virtual links. A network infrastructure virtualization process is divided into two sub-processes: link virtualization and node virtualization. The virtualization process involves the virtualization of network nodes and links by partitioning and/or aggregation of physical network resources, i.e. switches/routers and link capacities.

Network virtualization for packet switched networks (i.e. layer 3 (IP) and layer 2 (Ethernet)) is a relatively straightforward and very well understood concept. Moreover, there are several commercial solutions available which are widely deployed by network operators. Existing packet switched network virtualization solutions such as Virtual Private Network (VPN) and Virtual LAN (VLAN) take advantage of the digital nature of packet switched network equipment and transport formats.

However, compared to packet switched network technologies, optical and wireless network virtualization is a considerably more complex process. This is because it must take into account unique analogue parameters and features of the physical transmission medium, such as wavelength and spectrum continuity and power constraints as well as time-varying linear and non-linear channel impairments and constraints. These physical layer features impact the composition and isolation of coexisting virtual optical or wireless networks. Therefore, when virtualizing an optical or wireless network infrastructure, these inherent physical layer characteristics need to be taken into account.

Furthermore, existing virtualization mechanisms are generally capable only of operating off-line; they do not support on-demand or real-time virtualization of infrastructure. Also, existing virtualization mechanisms perform the virtual network composition in two consecutive stages, i.e. node virtualization followed by link virtualization. This approach creates a suboptimal solution.

In summary, the existing network virtualization mechanisms suffer from the following shortcomings:

They perform virtualization based on either slicing or aggregation. There is no virtualization mechanism that supports both schemes.

They support one type of network element only, i.e. optical or packet or wireless. There is no virtualization mechanism that supports all these technologies in a holistic way.

Existing optical and wireless virtualization technologies are specific to a particular optical or wireless transport format e.g. WDM optical or Wi-Fi.

Existing optical and wireless virtualization technologies do not take into account unique analogue features of the transmission medium such wavelength and spectrum continuity and power constraints as well as time-varying linear and non-linear channel impairments and constraints.

Existing virtualization mechanisms perform virtualization offline ('in-advance' virtualization) and lack the capability to perform on-demand virtualization.

Existing virtualization mechanisms are suboptimal. They perform virtualization in two separate stages i.e. node virtualization followed by link virtualization.

Existing virtualization mechanisms do not allow modification of an existing virtual infrastructure, e.g. modification of the virtual network topology or modification of capabilities or capacities of individual virtual nodes or links within the virtual network.

SUMMARY OF INVENTION

According to a first aspect of the present invention there is provided a virtualization device for composing a virtual network for implementation using physical network infrastructure, the virtualization device comprising: a node functionality and constraints module, configured to identify functionality and constraints of one or more nodes of the physical network infrastructure; a link constraints module, configured to identify constraints of one or more links of the physical network infrastructure; a network modeller module, configured to generate a model of the physical network infrastructure, based on the identified functionality and constraints of the nodes and on the identified constraints of the links; a virtual network composer module configured to receive a request for composition of a desired virtual network and to map the desired virtual network onto the physical network infrastructure based on the model generated by the network modelling module; and one or more node and link mapping modules for simultaneously mapping a virtual node of the desired virtual network onto one or more physical nodes or part of a physical node of the physical network infrastructure and for mapping a virtual link associated with the virtual node onto one or more physical links or part of a physical link of the physical network infrastructure.

The one or more node and link mapping modules may comprise a slicer module configured to map one virtual node onto a single physical node or part of a single physical node of the physical network infrastructure, and/or to map one virtual link onto a single physical link or part of a single physical link of the physical network infrastructure.

The one or more node and link mapping modules may further comprise an aggregator module configured to map a single virtual node onto multiple physical nodes of the physical network infrastructure, and/or to map a single virtual link onto multiple physical links of the physical network infrastructure.

The virtualization device may be configured to operate the aggregator module in the event of partial or complete failure of mapping using the slicer module.

The virtualization device may further comprise a channel aware path computation element configured to map virtual links which connect two adjacent virtual nodes.

The virtualization device may further comprise a transport quality checking module configured to perform a check that a required quality of transmission is met by the virtual network that has been composed by the virtualisation device.

The virtualization device may further comprise a virtual network control and monitoring module configured to receive and map virtual network control and monitoring messages received from the physical network infrastructure onto a software defined networking (SDN) protocol, and to map SDN protocol messages onto virtual network control and monitoring messages of the physical network infrastructure.

The virtual network control and monitoring module may be further configured to receive control and monitoring messages from an external controller and to transmit those messages to the physical network infrastructure.

The virtual network control and monitoring module may be further configured to receive virtual network control and monitoring messages from the physical network infrastructure and map them onto a software defined networking (SDN) protocol and transmit them to an external controller.

The virtual network control and monitoring module may be configured to modify an existing virtual network, by decommissioning part or parts of the existing virtual network that require modification and re-mapping the modified part or parts with new attributes.

The virtualization device may further comprise a first interface for connecting the virtualization device to one or more external network controllers.

The virtualization device may further comprise a second interface for connecting the virtualization device to the physical network infrastructure.

The second interface may support one or more of the following interfaces and protocols: Ethernet; SSH (Secure SHell); Telnet; TL1 (Transaction Language 1); SNMP (Simple Network Management Protocol); CAPWAP (Control And Provisioning of Wireless Access Points), ICMP (Internet Control Messaging Protocol); and OpenFlow® Version 1.0 addendum 0.3, Version 1.3, Version 1.4 or higher.

The physical network infrastructure may comprise one or more of the following devices: an optical fibre switch; an optical WDM (Wavelength Division Multiplexing) switch; an optical flexi WDM switch; an optical fixed grid WSS (Wavelength Selective Switching) device, an optical flexi grid WSS device, a wireless access point controller (including a WiFi® controller or an eNodeB (Enhanced Node B) of an LTE (Long-Term Evolution) or LTE-A (LTE advanced) network); a wireless access point; and a packet switch.

The node functionality and constraint module may be configured to collect the following information about nodes of the physical network architecture: node dimensions; switching capability of node; switching constraints; port features; peering information; node monitoring capability.

The link constraint module may be configured to collect the following information about links of the physical network infrastructure: constant characteristics of the link; and time-, frequency-, or space-dependent characteristics of the link.

The virtual network composer module may be configured to generate a virtual network mapping optimisation objective based on the received virtual network composition request.

The virtual network optimisation objective may be based on one or more of: the availability of resources in the physical network infrastructure, the number of co-existing virtual networks and quality of service (QoS) requirements.

According to a second aspect of the invention there is provided a network controller comprising a virtualization device according to the first aspect.

According to a third aspect of the invention there is provided a software module for use in a virtualization device for composing a virtual network for implementation using physical network infrastructure, the software module comprising: a node functionality and constraints module, configured to identify functionality and constraints of one or more nodes of the physical network infrastructure; a link constraints module, configured to identify constraints of one or more links of the physical network infrastructure; a network modeller module, configured to generate a model of the physical network infrastructure, based on the identified functionality and constraints of the nodes and on the identified constraints of the links; a virtual network composer module configured to receive a request for composition of a desired virtual network and to map the desired virtual network onto the physical network infrastructure based on the model generated by the network modelling module; and one or more node and link mapping modules for simultaneously mapping a virtual node of the desired virtual network onto one or more physical nodes or part of a physical node of the physical network infrastructure and for mapping a virtual link associated with the virtual node onto one or more physical links or part of a physical link of the physical network infrastructure.

According to a fourth aspect of the invention there is provided a software module for use in a network operating system for composing a virtual network for implementation using physical network infrastructure, the software module comprising: a node functionality and constraints module, configured to identify functionality and constraints of one or more nodes of the physical network infrastructure; a link constraints module, configured to identify constraints of one or more links of the physical network infrastructure; a network modeller module, configured to generate a model of the physical network infrastructure, based on the identified functionality and constraints of the nodes and on the identified constraints of the links; a virtual network composer module configured to receive a request for composition of a desired virtual network and to map the desired virtual network onto the physical network infrastructure based on the model generated by the network modelling module; and one or more node and link mapping modules for simultaneously mapping a virtual node of the desired virtual network onto one or more physical nodes or part of a physical node of the physical network infrastructure and for mapping a virtual link associated with the virtual node onto one or more physical links or part of a physical link of the physical network infrastructure.

The software modules of the third and fourth aspects of the invention may implement any of the features recited above in relation to the virtualization device of the first aspect.

In particular, the software modules may include a virtual network control and monitoring module configured to receive and map virtual network control and monitoring messages received from the physical network infrastructure onto a software defined networking (SDN) protocol, and to map SDN protocol messages onto virtual network control and monitoring messages of the physical network infrastructure. The virtual network control and monitoring module may be further configured to receive control and monitoring messages from an external controller and to transmit those messages to the physical network infrastructure, and the virtual network control and monitoring module may be further configured to receive virtual network control and monitoring messages from the physical network infrastructure and map them onto a software defined networking (SDN) protocol and transmit them to an external controller.

According to a fifth aspect of the invention there is provided a method for composing a virtual network for implementation using physical network infrastructure, the method comprising: identifying functionality and constraints of one or more nodes of the physical network infrastructure; identifying constraints of one or more links of the physical network infrastructure; generating a model of the physical network infrastructure, based on the identified functionality and constraints of the nodes and on the identified constraints of the links; receiving a request for composition of a desired virtual network and mapping the desired virtual network onto the physical network infrastructure based on the generated model; and performing a mapping process to simultaneously: map a virtual node of the desired virtual network onto one or more physical nodes or part of a physical node of the physical network infrastructure; and map a virtual link associated with the virtual node onto one or more physical links or part of a physical link of the physical network infrastructure.

Performing the mapping process may comprise performing a slicing process, wherein the slicing process is operative to map a virtual node or a virtual link of the desired virtual network onto a whole or part of a whole physical node or a whole or part of a whole physical link of the physical network infrastructure.

If the slicing process is only partially successful, the method may comprise performing a combination of a slicing process and an aggregation process, wherein the slicing process is operative to map a virtual node of the desired virtual network onto a whole or part of a whole physical node of the physical network infrastructure or to map a virtual link of the desired virtual network onto a whole or part of a whole physical link of the physical network infrastructure, and wherein the aggregation process is operative to map a virtual node of the desired virtual network onto multiple physical nodes of the physical network infrastructure, or to map a virtual link of the desired virtual network onto multiple physical links of the physical network infrastructure.

If the slicing process is unsuccessful, the method may comprise performing an aggregation process, wherein the aggregation process is operative to map a virtual node of the desired virtual network onto multiple physical nodes of the physical network infrastructure, and to map a virtual link of the desired virtual network onto multiple physical links of the physical network infrastructure.

If the slicing process and the aggregation process are unsuccessful, the method may comprise undoing all completed mappings for the virtual network, selecting a different virtual node of the virtual network infrastructure as a starting point and performing the mapping process again.

The method may further comprise performing a quality of transport checking process once all of the virtual nodes and links of the desired virtual network have been successfully mapped.

If the quality of transport checking process is unsuccessful, the method may comprise un-mapping nodes and links of the desired virtual network that failed the quality of transport checking process and attempting to map the failed nodes and links of the desired virtual network to different physical network resources.

BRIEF DESCRIPTION OF THE DRAWINGS

Embodiments of the invention will now be described, strictly by way of example only, with reference to the accompanying drawings, of which.

DESCRIPTION OF THE EMBODIMENTS

In order to extend the benefits of virtualization to networks that include optical and wireless network elements, and to address the deficiencies identified above, the applicant has devised a virtualization device (sometimes referred to as a "virtualization middle-box") which acts as a network virtualizer, performing processes required for the composition or modification of a virtual network.

Figure 1:
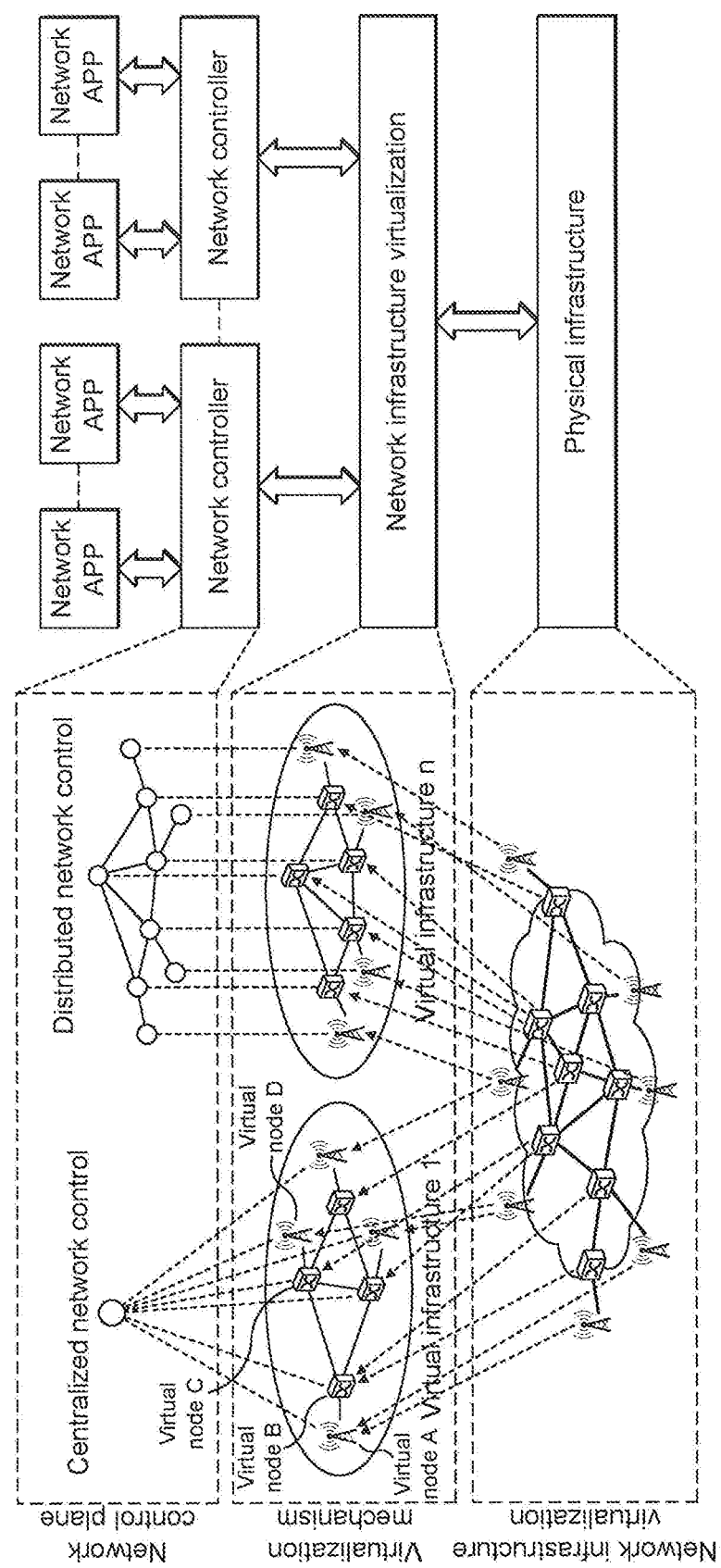
FIG. 1 is a schematic diagram illustrating the concept of network virtualization.
Figure 2:
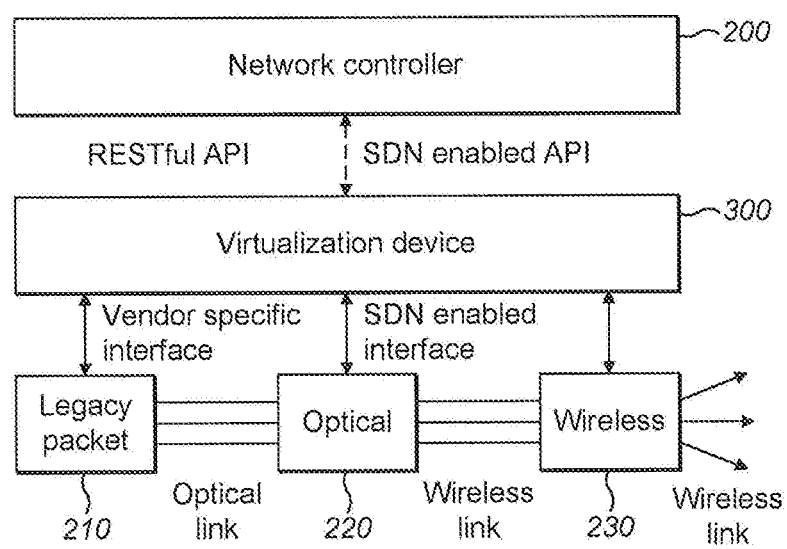
FIG. 2 is a schematic diagram illustrating network infrastructure virtualization using a virtualization device.

FIG. 2 is a schematic diagram illustrating network infrastructure virtualization using a virtualization device. As can be seen from FIG. 2, a virtualization device 300 sits between the network's control plane (illustrated in FIG. 2 as a network controller 200), and the physical network infrastructure (which, in the schematic diagram of FIG. 2 are illustrated as a legacy packet element 210, an optical element 220 and a wireless element 230, though it will be appreciated by those skilled in the art that the physical network infrastructure can be a network comprising any combination of these devices).

The virtualization device 300 is a plug and playable device which performs virtualization of both network devices and links (which may be based on wireless, optical or legacy packet technologies). The virtualization device 300 is configured (either pre-configured prior to installation or post-configured after installation) for operation with devices from specific vendors and/or for operation with specific technologies.

The virtualization device 300 communicates with the network elements of the physical network infrastructure via vendor-specific interfaces or SDN (Software Defined Networking) interfaces based on international standards such as the OpenFlow® protocol. The virtualization device 300 communicates with the control plane and network controller 200 via a RESTful API (Application Programming Interface) or an API supporting an SDN protocol such as the OpenFlow® protocol.

The network elements of the physical network infrastructure include one or more of the following devices: an optical fibre switch; an optical WDM (Wavelength Division Multiplexing) switch; an optical flexi WDM switch; an optical fixed grid WSS (Wavelength Selective Switching) device, an optical flexi grid WSS device, a wireless access point controller (including a WiFi® controller or an eNodeB (Enhanced Node B) of an LTE (Long-Term Evolution) or LTE-A (LTE advanced) network); a wireless access point; and a packet switch.

Figure 3:
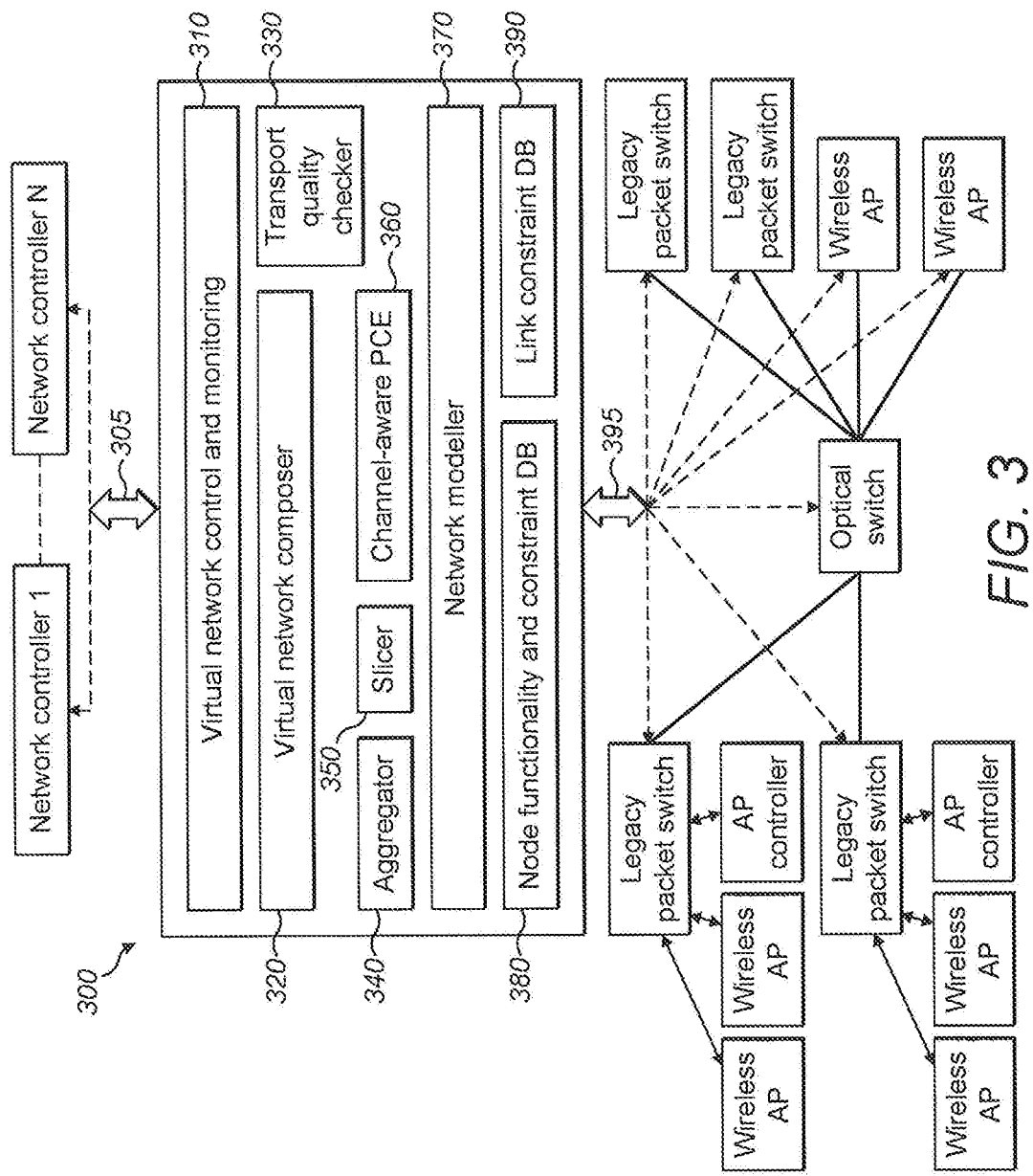
FIG. 3 is a schematic diagram showing a virtualization device and its main building blocks.

FIG. 3 is a schematic illustration of the virtualization device 300. The virtualization device 300 comprises a hardware platform which may be, for example, an FPGA (Field Programmable Gate Array) platform, a platform based on semiconductor IP provided by ARM, a platform based on a proprietary ASIC (Application Specific Integrated Circuit), or a platform including servers and embedded platforms using general purpose processors (e.g., servers or platforms by Intel Corporation or AMD).

As can be seen from FIG. 3, the virtualization device 300 includes a virtual network control and monitoring module 310, a virtual network composition module 320, a transport quality checking module 330, an aggregator module 340, a slicer module 350, a channel aware path computation element (PCE) module 360, a network modelling module 370, a node functionality and constraint database module 380 and a link constraint database module 390. The modules 310-390 may be implemented as software modules executing on the hardware platform, or as individual hardware modules.

The virtualization device 300 also includes a first, northbound, interface 305, which connects the virtualization device 300 to one or more network controllers and a second, southbound, interface 395, which connects the virtualization device 300 to network devices with optical, packet or wireless traffic or bandwidth switching and/or routing capability, via the control and management interfaces of those devices.

The northbound interface 305 is connected to one or more network controllers supporting any combination of the following interfaces and protocols: a RESTful API; or an API supporting OpenFlow® protocol Version 1.0 addendum 0.3, Version 1.3, Version 1.4 or higher. The interface is supported over an Ethernet socket layer.

The northbound interface 305 can be connected to multiple external network controllers at the same time, and enables any external network controller to control, monitor and operate virtual networks composed by the virtualization device 300. Further, the northbound interface 305 enables any external network controller to request a new virtual network at any time, or to request modification of an existing virtual network.

The southbound interface 395 is capable of connecting the virtualization device to any (or all) of the following devices: an optical fibre switch; an optical WDM (Wavelength Division Multiplexing) switch; an optical flexi WDM switch; an optical fixed grid WSS (Wavelength Selective Switching) device, an optical flexi grid WSS device, a wireless access point controller (including a WiFi® controller or an eNodeB (Enhanced Node B) of an LTE (Long-Term Evolution) or LTE-A (LTE advanced) network); a wireless access point; or a packet switch.

The southbound interface 395 supports any combination of the following interfaces and protocols: Ethernet; SSH (Secure SHell); Telnet; TL1 (Transaction Language 1); SNMP (Simple Network Management Protocol); CAPWAP (Control And Provisioning of Wireless Access Points), ICMP (Internet Control Messaging Protocol); or OpenFlow® Version 1.0 addendum 0.3, Version 1.3, Version 1.4 or higher.

As will be explained in more detail below, the modules 310-390 are configured to perform virtualization of the underlying network infrastructure by aggregation and/or slicing, and to perform composition and maintenance of multiple co-existing virtual networks. The modules 310-390 are further configured to maintain and guarantee QoS of individual virtual networks, to maintain isolation between the individual virtual networks, and to enable independent control and operation of the individual virtual networks.

The operation of the individual modules 310-390 will now be described in more detail.

The virtual network control and monitoring module 310 is configured to perform functions relating to the control and monitoring of virtual networks. Thus, the virtual network control and monitoring module 310 enables an external controller to control, monitor and operate a virtual network (once that virtual network has been successfully composed), via the northbound interface 305.

The virtual network control and monitoring module 310 maps virtual network control and monitoring messages into an SDN based protocol such as (but not limited) to OpenFlow® Version 1.0 addendum 0.3, Version 1.3, Version 1.4 or higher or a RESTful API. These virtual network control and monitoring messages are received via the southbound interface 395 from those parts of the physical infrastructure (nodes and links) that are used for mapping the virtual network.

The virtual network control and monitoring module 310 receives, from a controller external to the virtualization device 300, via the northbound interface 305 and through an SDN based protocol such as (but not limited to) OpenFlow® Version 1.0 addendum 0.3, Version 1.3, Version 1.4 or higher or a RESTful API, control and monitoring messages, and transmits these messages to those parts of the physical infrastructure (nodes and links) that are used for mapping the virtual network, via the southbound interface 395.

Further, the virtual network control and monitoring module 310 allows an external network controller to request modifications to an existing (already composed) virtual network. The virtual network control and monitoring module 310 can change the topology, link capacity and node size and features of an existing virtual network. To do this, it "un-maps" (i.e. decommissions) those parts of the virtual network that require modification and triggers the mapping process (described below) for the modified parts.

The virtual network composer module 320 is configured to receive requests for composition of a virtual network from an external controller, via the northbound interface 305 of the virtualization device 300. The virtual network composer module 320 uses the transport quality checker module 330, the aggregator module 340, the slicer module 350, and the channel-aware path computation element (PCE) module 360 to map any arbitrary virtual network onto the available physical network infrastructure based on information received from the network modeller module 370. The process performed by the virtual network composer 320 is explained in more detail below with reference to FIGS. 4a and 4b.

The network modeller module 370 uses information collected by the node functionality and constraint database module 380 and the link constraint database module 390 to generate an accurate model of the available physical network infrastructure, including its topology, characteristics of the communication links, functionalities and operational ranges as well as constraints of network nodes in the time, frequency and space domains. The generated model is passed by the network modeller module 370 to the virtual network composer module 320.

The node functionality and constraint database module 380 communicates with individual network nodes (i.e. network devices with traffic or bandwidth switching/routing capability) within the physical infrastructure, via the southbound interface 395, to collect the following information:

the node's dimensions, in term of its number of ports;
the switching capability of the node. This includes the switching technology, operational range, throughput and processing power of the node in the time, frequency or space domains (modern all-optical switching devices and wireless devices operate on switching and transmission of analogue bandwidth. This means they operate on transmission and switching of wireless or optical bandwidth in the time, frequency or space domains or any combination of the time, frequency and space domains);
switching constraints, e.g. switching speed or port-to-port latency;
port features, including constraints and operational ranges, e.g. minimum and maximum power, and port capabilities for operating (transmitting and receiving data) in the time, frequency or space domains;
peering information. For each node, this information includes addressee and/or an identification number for its immediate adjacent nodes. It also includes details of the ports that interconnect the two adjacent nodes; and
node monitoring capability. This includes the capability of the node to monitor its switching performance and quality of transmission.

The link constraint database module 390 collects information about the transmission characteristics of links or channels in the network (e.g. optical fibres or wireless channels). It includes two types of information:

Constant characteristics such as the type of fibre (e.g. single mode or multi-mode) or type of wireless channel (e.g. indoor or outdoor); and
Time and/or frequency and/or bit rate dependent characteristics such as fibre attenuation and fibre polarization mode dispersion or wireless channel fading. As the transmission links are passive network elements they cannot communicate directly with the virtualization device 300. Therefore, available link parameters either need to be entered manually or collected via the monitoring capabilities of network nodes.

Figure 4A:
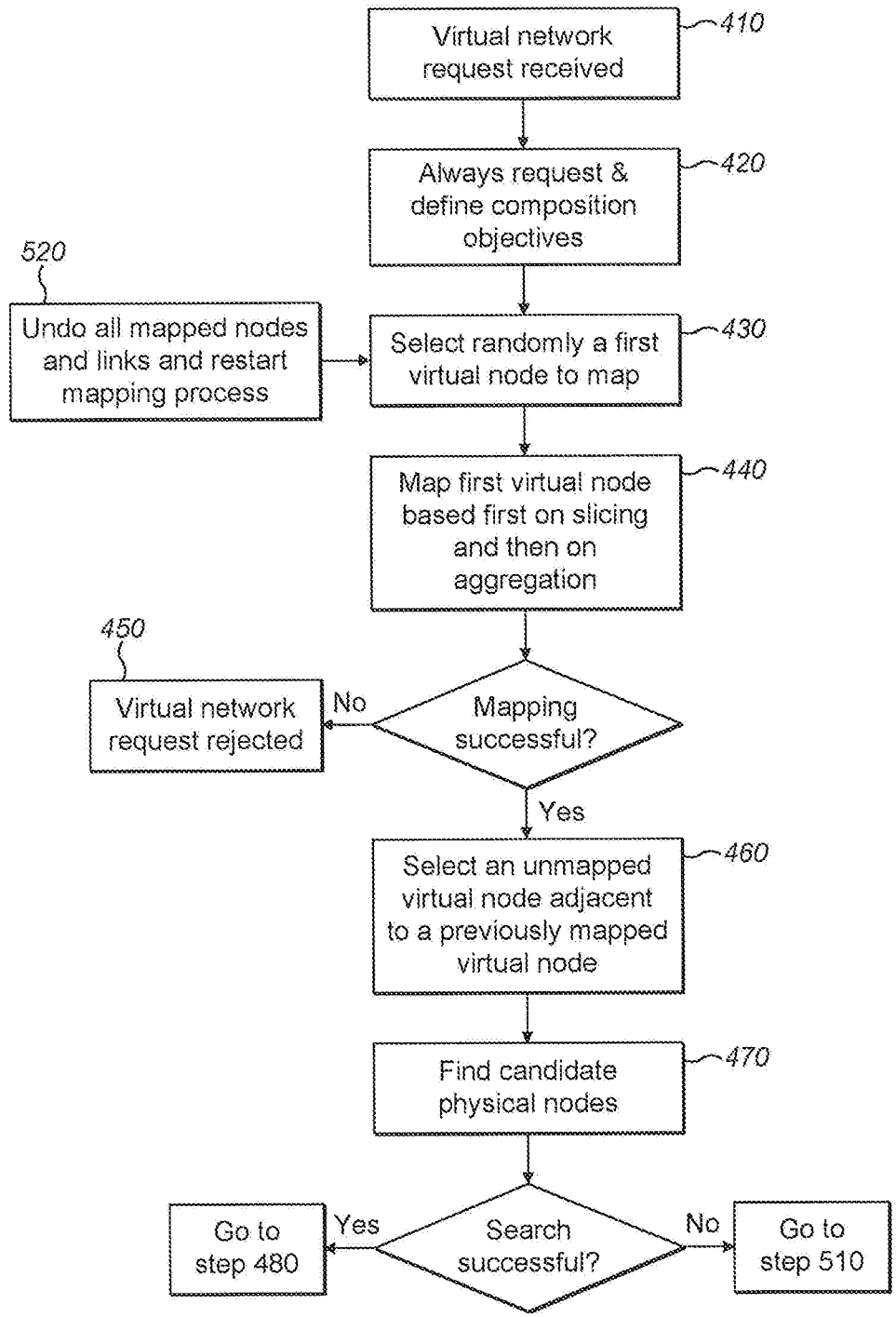
FIGS. 4a and 4b present a flow chart illustrating the operation of the virtualization device of FIG. 3.
Figure 4B:
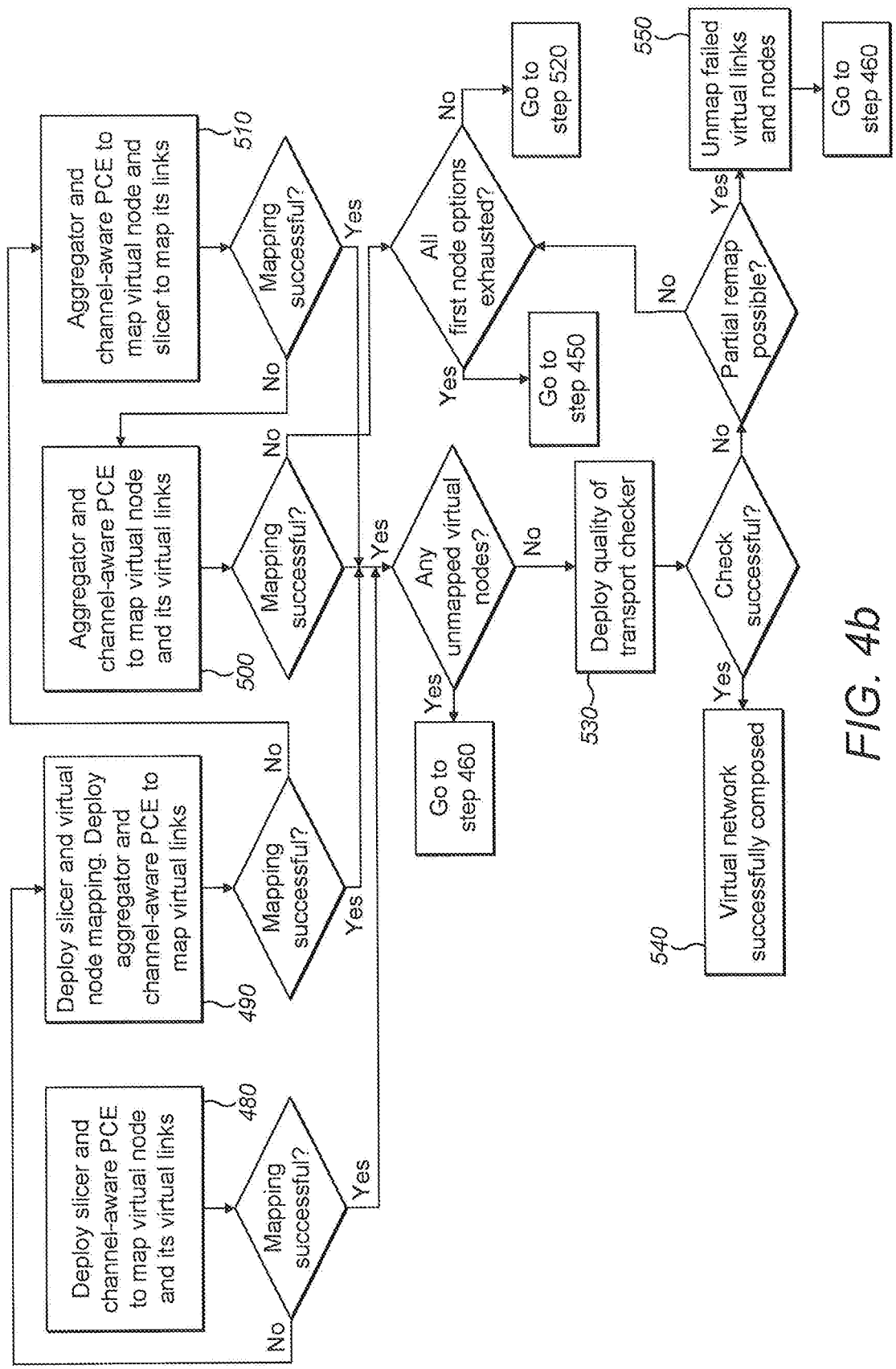

When a request to compose a new virtual network is received by the virtualization device 300 from an external controller over the northbound interface 305, the virtual network composer module 320 instigates a virtual network mapping process, as will now be described with reference to the flowchart 400 of FIGS. 4a and 4b.

A request to compose a new virtual network includes detailed information about the topology of the desired virtual network, its virtual nodes and their connectivity. The request may also include virtual node locations, functionalities and capabilities and expected QoS.

Following receipt of a request to compose a new virtual network (at step 410 in FIG. 4a), the received request is analysed at step 420 by the virtual network composer module 320 to determine the required physical nodes and transmission technologies, and the quality of transmission required to satisfy the QoS requirement of the request. The analysis also determines a virtual network mapping optimisation objective. This can be determined for each request based on the availability of resources in the physical network infrastructure, the number of co-existing virtual networks and the QoS requirements. For example, the optimisation objective may be to generate a mapping with the fewest physical nodes in order to minimise cost, or may be to generate a load balanced mapping to homogeneously distribute virtual networks across physical layer resources. The optimisation objective can also be fixed and preconfigured in the virtualization device 300, or alternatively can be determined by one network controller or by multiple network controllers for each virtual network request.

Following the analysis step 420, an arbitrary virtual node is selected at step 430 as a first virtual node to map. Importantly, the selected virtual node should not be a virtual node which has previously been selected as the first virtual node to map. The selected first virtual node is then mapped to the physical layer at step 440 using information collected by the network modeller module 370. This mapping is achieved by the slicer module 350 or by the aggregator module 340 if slicing is not possible. If the mapping process performed at step 440 is not successful, the request for composition of the virtual network is rejected at step 450.

Following successful mapping of the first virtual node at step 440, an arbitrary unmapped virtual node adjacent to a previously mapped virtual node is selected at step 460. Using information collected by the network modeller module 370, the selected virtual node and its interconnecting virtual links are mapped onto the physical layer (these are links that connected the selected virtual node to its previously mapped adjacent virtual nodes). In order to do this, a search for candidate physical nodes is undertaken at step 470. If this search is successful, the slicer module 350 and/or the aggregator module 340 and the channel-aware PCE module 360 carry out the mapping of the selected virtual node and its virtual links onto the physical layer, at steps 480, 490, 500 and 510.

Unlike in conventional network virtualization techniques, which perform a two-step mapping of links and nodes, in the virtualization device 300 node and link mapping are performed at the same time.

First (at step 480) the mapping process aims simultaneously to map both the virtual node and its links using the slicer module 350. This means that a virtual node is mapped directly to a physical node or part of a physical node and each virtual link is mapped directly to a physical link or part of a physical link (note that a physical link can be comprised of multiple concatenated links traversing several nodes).

The slicer module 350 and the slicing process performed in step 480 aim to map a virtual node or a virtual link onto a whole physical resource (node or link) or part of a physical resource (node or link). Slicing is performed based on the requirements of virtual nodes and links in the time, space and frequency domains. The slicing process take into account requirements of virtual nodes and links, quality of transport and the optimisation objective defined in step 420, as well as isolation between existing virtual networks and the newly mapped nodes and links.

For mapping virtual links interconnecting two adjacent virtual nodes, the channel-aware PCE module is used 360. This takes into account time-, frequency- and bit rate-dependent analogue features of links, as well as constant (i.e. time-, frequency and bit-rate-independent) features of links.

If the mapping process based on slicing is only partially successful, i.e. either the virtual node or one of its interconnecting virtual links cannot be mapped using slicing, then the mapping will be performed based on a combination of aggregation and slicing, at steps 490 and 510. At step 490 node mapping is performed using slicing (via the slicer module 350) and simultaneously link mapping is performed using aggregation (via the aggregator module 340). At step 510 node mapping is performed using aggregation (via the aggregator module 340) and simultaneously link mapping is performed using slicing (via the slicer module 350).

If the mapping process based on slicing is completely unsuccessful then the aggregator module 340 will be used, at step 500, to perform a mapping process for simultaneously mapping both the virtual node and its virtual links.

The aggregation process performed at steps 500 and 510 and the aggregator module 340 aim to map one virtual node onto multiple physical nodes. The aggregation process performed in steps 490 and 500 and the aggregator module 340 also aim to map one virtual link onto multiple physical links. Aggregation is performed based on the requirements of a virtual node and its links in the time, space and frequency domains. The aggregation process takes into account the requirements of the virtual node and its interconnecting links, quality of transport and the optimisation objective defined in step 420, as well as isolation between existing virtual networks and the newly mapped nodes and links. Physical nodes that are aggregated into a virtual node will be interconnected with network links that are calculated by the channel-aware PCE module 360. This takes into account time-, frequency- and bit rate-dependent analogue features of the nodes, as well as constant (i.e. time-, frequency- and bit rate-independent) analogue features of the nodes. Physical links that are aggregated into a virtual link are also calculated by the channel-aware PCE module 360. Again, this takes into account both constant and time-, frequency- and bit rate-dependent analogue features of the links.

If a mapping step cannot be performed successfully with slicing, aggregation or a combination of both, then all of the mapping processes performed for the virtual network will be undone at step 520 and the process will return to step 430 to restart by choosing a different virtual node as a starting point for the mapping process.

If a mapping step cannot be performed successfully with slicing, aggregation or a combination and also all virtual nodes in the virtual network request have been tried as a starting point for the mapping process, then the virtual network request will be rejected, at step 450.

After successful mapping of all virtual nodes and links a final quality of transport checking process is executed at step 530. This process, which uses the transport quality checker module 330, examines all possible end-to-end path combinations within a newly composed (mapped) virtual network to ensure that they satisfy the required quality of transmission determined by the request analysis process of step 420. This quality of transport checking process also checks that isolation is guaranteed between the newly composed virtual network and existing virtual networks. This process takes into account constant and time-, frequency- and bit rate-dependent analogue features of links and nodes in order to guarantee both quality of transmission and isolation between existing virtual links and the newly mapped nodes and links.

If the quality of transport checking process is successfully executed, then the composition of a virtual network has been successfully completed; the mapping of a virtual network request onto the available physical infrastructure has completed successfully (step 540).

On the other hand, if quality of transport checking process fails, then failed nodes and links will be unmapped, at step 550, and the mapping process will be repeated, beginning at step 460 with the selection of a different virtual node as a starting point, for the failed nodes and links, to attempt to map the failed nodes and links of the virtual network to different physical network resources, until all possible solutions for mapping are exhausted.

When a virtual network is successfully composed, the virtual network composer 310 implements the result of the mapping process by configuring physical nodes, via the southbound interface 305, in order to realise the virtual nodes and links of the virtual network.

The virtualization device 300 has been described above as a physical device which sits between the control plane (e.g. network controller(s)) and the physical network infrastructure. However, it will be appreciated that the virtualization device hardware could equally be incorporated into a control plane device such as a network controller. Alternatively, the virtualization device 300 could be implemented as one or more software modules for execution on an appropriately configured standalone hardware platform, or for inclusion as part of a network operating system which oversees and orchestrates data flows between the network devices in a network.

The virtualization device 300 of the present invention is able to perform on-demand network virtualization for physical network infrastructure including any combination of optical, wireless and packet-based network elements, using both slicing and aggregation. A virtual network can be composed and modified dynamically as requirements evolve and change. Thus, the network virtualization device 300 permits rapid and flexible deployment and modification of robust and efficient coexisting virtual networks using the same physical network infrastructure.

The invention claimed is:

1. A method for composing a virtual network for implementation using physical network infrastructure, the method comprising:

identifying functionality and constraints of one or more nodes of the physical network infrastructure;
identifying constraints of one or more links of the physical network infrastructure;
generating a model of the physical network infrastructure, based on the identified functionality and constraints of the nodes and on the identified constraints of the links;
receiving a request for composition of a desired virtual network and mapping the desired virtual network onto the physical network infrastructure based on the generated model; and
performing a mapping process to simultaneously:
map a virtual node of the desired virtual network onto one or more physical nodes or part of a physical node of the physical network infrastructure; and
map a virtual link associated with the virtual node onto one or more physical links or part of a physical link of the physical network infrastructure.

2. The method according to claim 1 wherein performing the mapping process comprises performing a slicing process, wherein the slicing process is operative to map a virtual node or a virtual link of the desired virtual network onto a whole or part of a whole physical node or a whole or part of a whole physical link of the physical network infrastructure.

3. The method according to claim 2 wherein, if the slicing process is only partially successful, the method comprises performing a combination of a the slicing process and an aggregation process, wherein the slicing process is operative to map a virtual node of the desired virtual network onto a whole or part of a whole physical node of the physical network infrastructure or to map a virtual link of the desired virtual network onto a whole or part of a whole physical link of the physical network infrastructure, and wherein the aggregation process is operative to map a virtual node of the desired virtual network onto multiple physical nodes of the physical network infrastructure, or to map a virtual link of the desired virtual network onto multiple physical links of the physical network infrastructure.

4. The method according to claim 2 wherein, if the slicing process is unsuccessful, the method comprises performing an aggregation process, wherein the aggregation process is operative to map a virtual node of the desired virtual network onto multiple physical nodes of the physical network infrastructure, and to map a virtual link of the desired virtual network onto multiple physical links of the physical network infrastructure.

5. The method according to claim 4 wherein, if the slicing process and the aggregation process are unsuccessful, the method comprises undoing all completed mappings for the virtual network, selecting a different virtual node of the virtual network infrastructure as a starting point and performing the mapping process again.

6. The method according to claim 1 wherein the method further comprises performing a quality of transport checking process once all of the virtual nodes and links of the desired virtual network have been successfully mapped.

7. The method according to claim 6 wherein, if the quality of transport checking process is unsuccessful, the method comprises un-mapping nodes and links of the desired virtual network that failed the quality of transport checking process and attempting to map the failed nodes and links of the desired virtual network to different physical network resources.

8. A virtualization device for composing a virtual network for implementation using physical network infrastructure, the virtualization device comprising:
a processor; and
memory storing instructions which, when executed by tlte processor, cause the processor to:
identify functionality and constraints of one or more nodes of the physical network infrastructure;
identify constraints of one or more links of the physical network infrastructure;
generate a model of the physical network infrastructure, based on the identified functionality and constraints of the nodes and on the identified constraints of the links;
receive a request for composition of a desired virtual network and mapping the desired virtual network onto the physical network infrastructure based on the generated model; and
perform a mapping process to simultaneously:
map a virtual node of the desired virtual network onto one or more physical nodes or part of a physical node of the physical network infrastructure; and
map a virtual link associated with the virtual node onto one or more physical links or part of a physical link of the physical network infrastructure.

9. The virtualization device of claim 8, wherein performing the mapping process comprises performing a slicing process, wherein the slicing process is operative to map a virtual node or a virtual link of the desired virtual network onto a whole or part of a whole physical node or a whole or part of a whole physical link of the physical network infrastructure.

10. The virtualization device of claim 9, wherein, if the slicing process is only partially successful, the instructions further cause the processor to perform a combination of a slicing process and an aggregation process, wherein the slicing process is operative to map a virtual node of the desired virtual network onto a whole or part of a whole physical node of the physical network infrastructure or to map a virtual link of the desired virtual network onto a whole or part of a whole physical link of the physical network infrastructure, and wherein the aggregation process is operative to map a virtual node of the desired virtual network onto multiple physical nodes of the physical network infrastructure, or to map a virtual link of the desired virtual network onto multiple physical links of the physical network infrastructure.

11. The virtualization device of claim 9, wherein, if the slicing process is unsuccessful, the instructions further cause the processor to perform an aggregation process, wherein the aggregation process is operative to:
map a virtual node of the desired virtual network onto multiple physical nodes of the physical network infrastructure; and
map a virtual link of the desired virtual network onto multiple physical links of the physical network infrastructure.

12. The virtualization device of claim 11, wherein, if the slicing process and the aggregation process are unsuccessful, the instructions further cause the processor to:
undo all completed mappings for the virtual network;
select a different virtual node of the virtual network infrastructure as a starting point; and
perform the mapping process again.

13. The virtualization device of claim 10, wherein the instructions further cause the processor to perform a quality of transport checking process once all of the virtual nodes and links of the desired virtual network have been successfully mapped.

14. The virtualization device of claim 13 wherein, if the quality of transport checking process is unsuccessful, the instructions further cause the processor to:

un-map nodes and links of the desired virtual network that failed the quality of transport checking process; and attempt to map the failed nodes and links of the desired virtual network to different physical network resources.

15. The virtualization device of claim 8, wherein the instructions further cause the processor to perform a check that a required quality of transmission is met by the virtual network that has been composed by the virtualization device.

16. The virtualization device of claim 8, wherein the instructions further cause the processor to:
   receive and map virtual network control and monitoring messages received from the physical network infrastructure onto a software defined networking (SDN) protocol; and
   map SDN protocol messages onto virtual network control and monitoring, messages of the physical network infrastructure.

17. The virtualization device of claim 16, wherein the instructions further cause the processor to:
   receive control and monitoring messages from an external controller; and
   transmit the control and monitoring messages from the external controller to the physical network infrastructure.

18. The virtualization device of claim 16, wherein the instructions further cause the processor to modify an existing virtual network by decommissioning part or parts of the existing virtual network that require modification and re-mapping the modified part or parts with new attributes.

* * * * *